United States Patent [19]

Nodari

[11] Patent Number: 5,113,463
[45] Date of Patent: May 12, 1992

[54] CONNECTOR FOR FIBRE OPTIC CABLES

[75] Inventor: Abramo Nodari, Cassina De' Pecchi, Italy

[73] Assignee: Sirti S.p.A., Milan, Italy

[21] Appl. No.: 672,449

[22] Filed: Mar. 20, 1991

[30] Foreign Application Priority Data

Mar. 20, 1990 [IT] Italy .............. 20865/90[U]

[51] Int. Cl.$^5$ .............................................. G02B 6/38
[52] U.S. Cl. ........................................ 385/60; 385/56; 385/58
[58] Field of Search ............... 350/96.20, 96.21, 96.22, 350/96.23; 385/56, 58, 60

[56] References Cited

U.S. PATENT DOCUMENTS

| | | | |
|---|---|---|---|
| 2,877,437 | 3/1959 | Flanagan, Jr. ................... | 339/91 |
| 4,405,200 | 9/1983 | Hoffmann et al. ............... | 350/96.21 |
| 4,406,514 | 9/1983 | Hillegonds et al. ............. | 350/96.21 |
| 4,696,540 | 9/1987 | Adams et al. ................... | 350/96.21 |
| 4,962,991 | 10/1990 | Carvalho ........................ | 350/96.21 |
| 4,984,867 | 1/1991 | Giovanna ........................ | 350/96.21 |

FOREIGN PATENT DOCUMENTS 61-77810 4/1986 Japan .

OTHER PUBLICATIONS

Wire Industry, vol. 46, No. 9, Sep. 1979; pp. 637–640 W. H. Turley: "The Connection of Optical Fibres:".
Patent Abstracts of Japan, vol. 10, No. 250 (P-491) [2306] 28th Aug. 1986 [61-77810, Apr. 21, 1986].

*Primary Examiner*—John D. Lee
*Attorney, Agent, or Firm*—Longacre & White

[57] ABSTRACT

In a connector for fibre optic cables a female element with which a first terminal element of a fibre optic cable is associated and a male element with which there is associated a first sleeve into which a second terminal element is inserted, the female element being of the type which can be associated with a fixed assembly and comprising a base and a flanged sleeve free to position itself relative to the base by moving only in a plane perpendicular to the jointing axis of the connector. Any rotation of the flanged sleeve about the connector jointing axis or about axes parallel thereto is prevented; the male element consists of a hollow body closed by a flanged tubular element and provided with a bored end plate, the male element receiving the first sleeve in such a manner as to prevent its rotation and also receiving elastic means engaged with the end plate and with the first sleeve, the tubular element being lockably insertable into the female element.

7 Claims, 1 Drawing Sheet

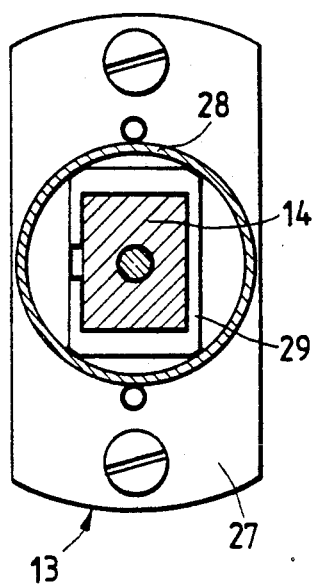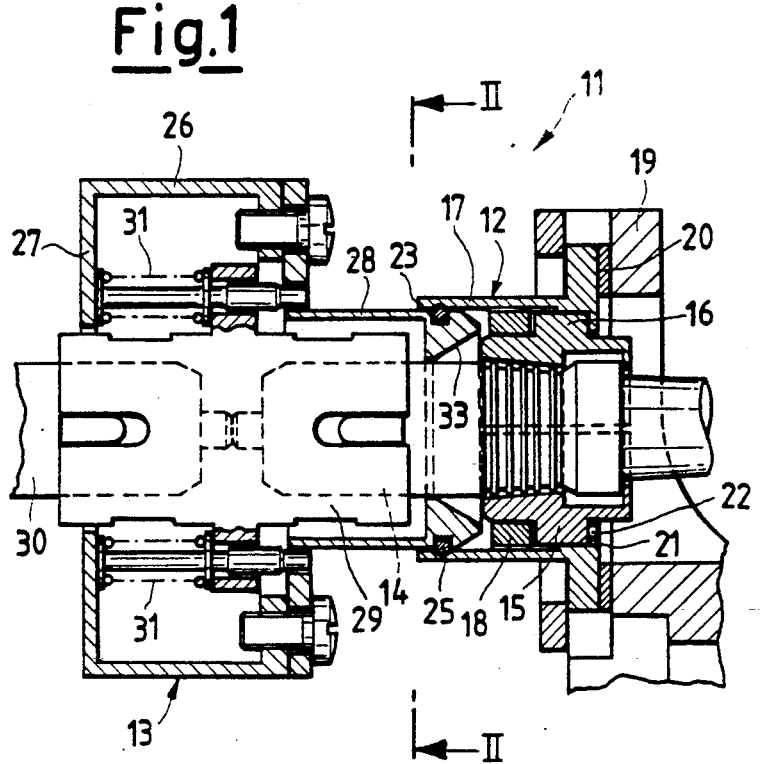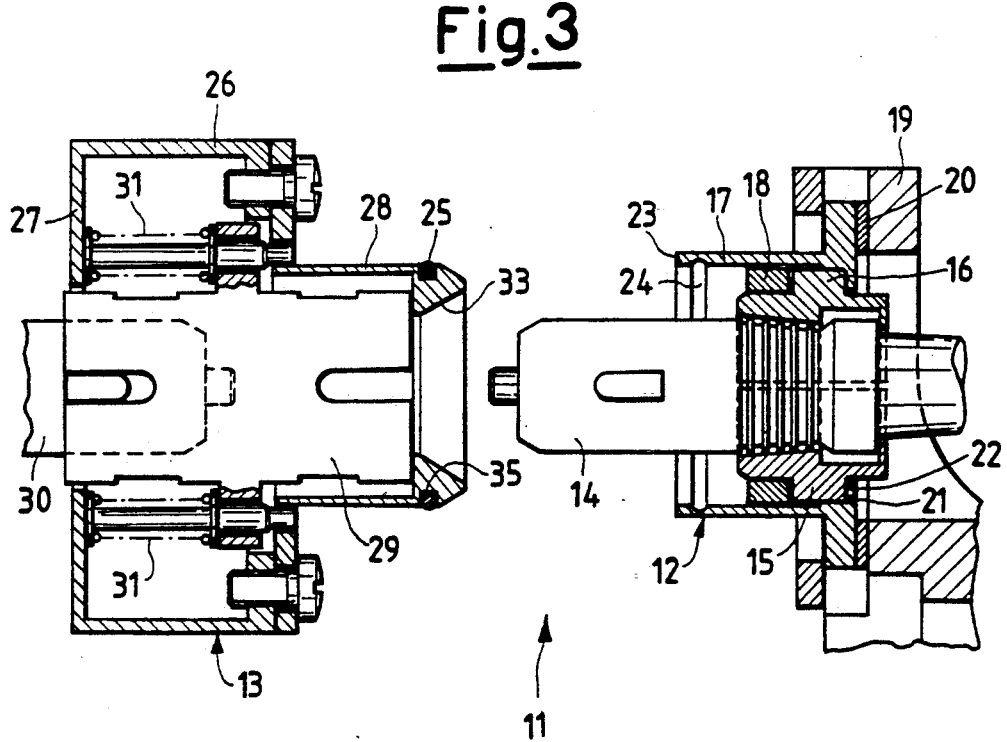

CONNECTOR FOR FIBRE OPTIC CABLES

This invention relates to a connector for fiber optic cables. Various types of connectors for fiber optic cables are known, their purpose being to bring the end sections of the cables to be joined together into coinciding, superposed relationship so that they mate perfectly.

This operation is very important in that the transmission efficiency and service of the cable depend on it. In this respect reference should be made to U.S. patent application Ser. No. 472,252 (now U.S. Pat. No, 4,984,867) in the name of the present applicant.

Various types of terminals for fiber optic cables are known, for each type it being necessary to provide an appropriate connector to obtain perfect coincidence and superposition of the cable end sections.

Some of these terminals are of essentially retangular section and can be joined together by a plastics sleeve which houses and retains the two abutting terminals.

However, such a sleeve does not ensure the necessary terminal joining accuracy.

The object of the present invention is to provide a connector for fiber optic cables which is able to correct such inaccuracy by reliably ensuring perfect coincidence between the end sections of the cables to be joined together.

This object is attained by providing in a connector for fiber optic cables a female element with which a first terminal element of a fiber optic cable is associated, and a male element with which there is associated a first sleeve into which a second terminal element is inserted, said female element being of the type which can be associated with a fixed assembly and comprising a base and a flanged sleeve free to position itself relative to said base by moving only in a plane perpendicular to the jointing axis of the connector, any rotation of said flanged sleeve about said connector jointing axis or about axes parallel thereto being prevented, characterised in that said male element consists of a hollow body closed by a flanged tubular element and provided with a holed end plate, said male element receiving said first sleeve in such a manner as to prevent its rotation and also receiving elastic means engaged with said end plate and with said first sleeve, said tubular element being lockably insertable into said female element.

According to the invention said connector is further characterised in that said female element is provided within said flanged sleeve with two half-collars and suitable fixing means able to render said first terminal element rigid with said flanged sleeve to prevent its rotation.

Said fixing means consist of a ring nut engageable with a complementary thread provided on the inside of said flanged sleeve and arranged to clamp said two half-collars together, one of said two half-collars being provided with a locating tooth engaging in a suitable seat provided in said flanged sleeve.

Furthermore, said tubular element has an internal portion of frusto-conical shape to receive said first terminal element associated with said female element.

Moreover according to the invention said tubular element is provided externally with a seat housing a split ring which snap-engages a complementary seat provided on the inside of said female element.

Said seat housing said split ring is provided on the outside of said tubular body, in a position corresponding with said frustoconically shaped portion.

Again according to the invention said elastic means are a pair of helical springs engaging said end plate and said first sleeve. Moreover, said holed end plate is provided with a substantially square aperture.

The characteristics and further advantages of the present invention will be more apparent from the description given hereinafter by way of non-limiting example with reference to the accompanying drawing in which:

FIG. 1 is an elevational view in part section of a connector according to the invention;

FIG. 2 is a section on the line II—II of FIG. 1; and

FIG. 3 is an exploded view of the components of FIG. 1.

In the figures the reference numeral 11 indicates overall a connector according to the invention, consisting essentially of a female element 12 and a male element 13. A first terminal 14 for a fiber optic cable is fixed to the female element 12 by two half-collars 15 and 16, which retain the terminal 14 within a flanged sleeve 17 by a threaded ring nut 18 which embraces the half-collars 15 and 16 and is screwed into the sleeve 17. The flanged sleeve 17 is provided in known manner with a groove (not shown), as is the base 19.

The groove in the base 19 faces and is perpendicular to the groove in the sleeve, between the base 19 and sleeve 17 there being provided an annular element 20 carrying on its two opposing faces two pairs of mutually perpendicular keys (not shown) which engage the grooves in the base 19 and sleeve 17. In this manner when joining the parts of the connector together the flanged sleeve 17 can slide along the perpendicular diameters defined by the keys in overall directions given by the combination of the two movements, but without being able to rotate on itself about the jointing axis.

The flanged sleeve 17 is also provided with a seat 21 which receives a pin 22 provided on the half-collar 15, to enable the terminal 14 to be correctly positioned. In proximity to the outwardly flared free end 23 of the sleeve 17 there is internally provided an annular seat 24 to receive a split ring 25 with which the male element 13 is provided.

The element 13 consists of a hollow body 26 closed by a flanged tubular element 28. The hollow body 26 is provided with a holed end plate 27 and internally houses a sleeve 29 into which a second fiber optic cable terminal 30 is inserted.

The flanged tubular element 28 which closes the hollow body 26 and cooperates in housing the sleeve 29 is provided in proximity to its free end with a seat 35 which receives the split ring 25. On the inside of the flanged tubular element 28 in a position corresponding with the seat 35 there is provided a frustoconically shaped portion 33 to receive the first terminal element 14 associated with the female element 12.

When the male and female component parts of the connector are joined together, the female element is usually rigid with a fixed assembly (not shown) to which the base 19 is fixed.

The terminal 14 is fixed to the flanged sleeve 17 by the half-collars 15 and 16 and the threaded ring nut 18. The half-collar 15 with the reference pin 22 on the half-collar 15 and the seat 21 in the flanged sleeve 17 ensure that the terminal 14 is correctly positioned for the connection. On inserting the male element 13 into the female element 12, the terminal 14 enters the sleeve 29 until it reaches an abutting position. When in this position (FIG. 1) the split ring 25 on the flanged tubular element 28 engages the annular seat 24 in the flanged sleeve 17.

The male element 13 carries at the other end of the sleeve 29 the other terminal 30, which thus abuts against the terminal 14. Any imperfections, working tolerances and/or inaccuracies in assembly or simply in the connecting together of the connector parts are taken up by the ability of the female element to move within a plane (see U.S. Ser. No. 472,252, U.S. Pat. No. 4,984,867) and by the springs 31 for the male element 13 and consequently for the sleeve 29 within which the terminals 14 and 30 of the fiber optic cables abut (snapwise).

I claim:

1. A connector for fiber optic cables comprising a female element with which a first terminal element of a fiber optic cable is associated and a male element with which there is associated a first sleeve into which a second terminal element is inserted, said female element being of the type which can be associated with a fixed assembly and comprising a base and a flanged sleeve free to position itself relative to said base by moving only in a plane perpendicular to the jointing axis of the connector, any rotation of said flanged sleeve about said connector jointing axis or about axes parallel thereto being prevented, characterized in that said male element consists of a hollow body closed by a flanged tubular element and provided with a bored end plate, said male element receiving said first sleeve in such a manner as to prevent its rotation and also receiving elastic means engaged with said end plate and with said first sleeve, said tubular element being lockably insertable into said female element, characterized in that said female element is provided within said flange sleeve with two half-collars and suitable fixing means able to render said first terminal element rigid with said flanged sleeve to prevent its rotation.

2. A connector as claimed 1, characterised in that said bored end plate is provided with a substantially square aperture.

3. A connector as claimed in claim 1, characterised in that said fixing means consist of a ring nut engageable with a complementary thread provided on the inside of said flanged sleeve and arranged to clamp said two half-collars together, one of said two half-collars being provided with a locating tooth engaging in a suitable seat provided in said flanged sleeve.

4. A connector as claimed in claim 1, characterised in that said tubular element has an internal portion of frusto-conical shape to receive said first terminal element associated with said female element.

5. A connector as claimed in claim 1, characterised in that said tubular element is provided externally with a seat housing a split ring which snap-engages a complementary seat provided on the inside of said female element.

6. A connector as claimed in claim 5, characterised in that said seat housing said split ring is provided on the outside of said tubular element, in a position corresponding with said frusto-conically shaped portion.

7. A connector as claimed in claim 1, characterised in that said elastic means are a pair of helical springs engaging said end plate and said first sleeve.

* * * * *